United States Patent
Soenen et al.

(10) Patent No.: US 8,004,259 B2
(45) Date of Patent: *Aug. 23, 2011

(54) DIGITAL CONTROL OF POWER CONVERTERS

(75) Inventors: Eric Soenen, Austin, TX (US); Alan Roth, Austin, TX (US); Martin Kinyua, Austin, TX (US); Justin Shi, Austin, TX (US)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 64 days.

This patent is subject to a terminal disclaimer.

(21) Appl. No.: 12/256,300

(22) Filed: Oct. 22, 2008

(65) Prior Publication Data

US 2009/0237054 A1    Sep. 24, 2009

Related U.S. Application Data

(63) Continuation of application No. 12/197,790, filed on Aug. 25, 2008.

(60) Provisional application No. 61/038,348, filed on Mar. 20, 2008.

(51) Int. Cl.
  *G05F 1/40* (2006.01)
(52) U.S. Cl. ........................................... 323/282
(58) Field of Classification Search .................. 323/265, 323/273, 282, 283, 284, 351
  See application file for complete search history.

(56) References Cited

U.S. PATENT DOCUMENTS

| | | | |
|---|---|---|---|
| 6,552,606 B1 | 4/2003 | Veltman et al. | |
| 6,693,400 B2 * | 2/2004 | Pedrazzini et al. | 318/567 |
| 6,952,131 B2 | 10/2005 | Jeong et al. | |
| 7,119,525 B1 | 10/2006 | Yoshino | |
| 7,200,187 B2 | 4/2007 | O'Brien | |
| 7,239,116 B2 * | 7/2007 | Tang | 323/282 |
| 7,276,963 B2 | 10/2007 | Wegner | |
| 7,391,197 B2 * | 6/2008 | Chang et al. | 323/283 |
| 7,394,314 B2 | 7/2008 | May | |
| 7,459,864 B2 * | 12/2008 | Lys | 315/291 |
| 2003/0174005 A1 | 9/2003 | Latham, II et al. | |
| 2006/0220938 A1 | 10/2006 | Leung et al. | |
| 2008/0129264 A1 | 6/2008 | Moussaoui et al. | |

FOREIGN PATENT DOCUMENTS

| | | |
|---|---|---|
| CN | 16 181 68 A | 5/2005 |
| CN | 1780131 A | 5/2006 |
| CN | 19 252 92 A | 3/2007 |
| CN | 1930541 A | 3/2007 |

(Continued)

OTHER PUBLICATIONS

Lukić, Z, et al., "High-Frequency Digital Controller for DC-DC Converters Based on Multi-Bit Σ-Δ Pulse-Width Modulation," 2005, IEEE, pp. 35-40.

(Continued)

*Primary Examiner* — Adolf Berhane
(74) *Attorney, Agent, or Firm* — Slater & Matsil, L.L.P.

(57) ABSTRACT

A system and method for controlling a power converter is presented. An embodiment comprises an analog differential circuit connected to an analog-to-digital converter, and comparing the digital error signal to at least a first threshold value. If the digital error signal is less than the first threshold value, a pulse is generated to control the power converter. Another embodiment includes multiple thresholds that may be compared against the digital error signal.

20 Claims, 5 Drawing Sheets

FOREIGN PATENT DOCUMENTS

WO    WO 2005/081770 A2    9/2005

OTHER PUBLICATIONS

Lukić, Z, et al., "Multibit Σ-Δ PWM Digital Controller IC for DC-DC Converters Operating at Switching Frequencies Beyond 10 MHz," IEEE Transactions on Power Electronics, vol. 22, No. 5, Sep. 2007, pp. 1693-1707.

Parayandeh, A., et al., "Programmable Analog-to-Digital Converter for Low-Power DC-DC SMPS," IEEE Transactions on Power Electronics, vol. 23, No. 1, Jan. 2008, pp. 500-505.

Dostal, F., "Emulated Ripple Technique Advances Hysteretic Switchmode Supplies," Feb. 25, 2008, Power Management DesignLine, http://www.powermanagementdesignline.com, 4 pages.

Forejt, B., et al., "A 700+-mW Class D Design With Direct Battery Hookup in a 90-nm Procee," IEEE Journal of Solid-State Circuits, vol. 40, No. 9, Sep. 2005, pp. 1880-1887.

Pressman, A.I., "'Buck' Switching Regulator Topology", Switching Power Supply Design, $2^{nd}$ Ed., McGraw-Hill, © 1998, pp. 9-24.

Pressman, A.I., "Feedback-Loop Stabilization", Switching Power Supply Design, $2^{nd}$ Ed., McGraw-Hill, © 1998, pp. 427-448.

Texas Instruments, TPS62000 Data Sheet, "High-Efficiency, Step-Down, Low Power, DC-DC Converter (Rev. E)," http://focus.ti.com/docs/prod/folders/print/tps62000.html; Aug. 18, 2008, © 2000-2008, Texas Instruments Incorporated, Dallas, TX, 26 pages.

Texas Instruments, TPS62040 Data Sheet, "1.2A / 1.25 MHz. High-Efficiency, Step-Down Converter (Rev. B)," http://focus.ti.com/docs/prod/folders/print/tps62040.html, Oct. 28, 2005, © 2003-2005, Texas Instruments Incorporated, Dallas, TX, 29 pages.

Texas Instruments, TPS62220 Data Sheet, "400-mA, 1.25-MHz High-Efficiency Step-Down Converter in Thin-SOT23 (rev. E)," http://focus.ti.com/docs/prod/folders/print/tps62220.html, Feb. 5, 2009, Copyright © 2003-2009, Texas Instruments Incorporated, Dallas, TX, 29 pages.

Texas, Instruments, TPS62260 Data Sheet, "2.25MHz 600mA Step Down Converter in 2x2SON/TSOT23 Package (Rev. B)," http://focus.ti.com/docs/prod/folders/print/tps62260.html, Feb. 19, 2008, Copyright © 2007-2008, Texas Instruments Incorporated, Dallas, TX, 31 pages.

Analog Devices, ADP2102 Data Sheet, "Low Duty Cycle, 600mA, 3MHz Synchronous Step-Down DC-to-DC Converter," Rev. B, http://www.analog.com/en/power-management/switching-regulators-integrated-fet-switches/ADP2102/products/product.html, Sep. 2007, © 2007 Analog Devices, Inc., Norwood, MA, 24 pages.

Coilcraft, LPS3015 Series Data Sheet, "Low Profile Shielded Power Inductors," http://www.coilcraft.com/lps3015.cfm, Doc. 436-1, Revised Aug. 5, 2009, © Coilcraft, Inc. 2010, Cary, IL, 2 pages.

Maxim, MAX8640Y/MAX8640Z Data Sheet, "Tiny 500mA, 4MHz/2MHz Synchronous Step-Down DC-DC Converters," http://datasheets.maxim-ic.com/en/ds/MAX8640Y-MAX8640Z.pdf, 19-3997; Rev 4; Feb. 2009, © 2009 Maxim Integrated Products, Sunnyvale, CA, pp. 1-12.

Linear Technology, LTC3614 Data Sheet, "4A, 4MHz Monolithic Synchronous Step-Down DC/DC Converter," http://cds.linear.com/docs/Datasheet/3614f.pdf, © Linear Technology Corporation 2010, Milpitas, CA, pp. 1-28.

United States Patent and Trademark Office, Office Action, U.S. Appl. No. 12/134,930, Mar. 4, 2010, 5 pages.

Texas Instruments, "DC/DC Converters (Integrated Switch)—Step-Down Regulators"—TPS62000, http://focus.ti.com/docs/prod/folders/print/tps62000.html, Texas Instruments Incorporated, Dallas, TX, 4 pages, downloaded Jun. 4, 2010.

Texas Instruments, "DC/DC Converters (Integrated Switch)—Step-Down Regulators"—TPS62040, http://focus.ti.com/docs/prod/folders/print/tps62040.html, © 1995-2010, Texas Instruments Incorporated, Dallas, TX, 5 pages, downloaded Jun. 4, 2010.

Texas Instruments, "DC/DC Converters (Integrated Switch)—Step-Down Regulators"—TPS62220, http://focus.ti.com/docs/prod/folders/print/tps62220.html, © 1995-2010, Texas Instruments Incorporated, Dallas, TX, 5 pages, downloaded Jun. 4, 2010.

Texas Instruments, "DC/DC Converters (Integrated Switch)—Step-Down Regulators"—TPS62260, http://focus.ti.com/docs/prod/folders/print/tps62260.html, © 1995-2010, Texas Instruments Incorporated, Dallas, TX, 6 pages, downloaded Jun. 7, 2010.

Analog Devices, ADP2102, "Low Duty Cycle, 600mA, 3MHz Synchronous Step-Down DC-to-DC Converter," http://www.analog.com/en/power-management/switching-regulators-integrated-fet-switches/ADP2102/products/product.html, 2 pages, downloaded Jun. 7, 2010.

Zhu, C., "The Buck Converter and the Design of Power Managing Chip," Masters Thesis, Jilin University, Jun. 2004-Apr. 2006, pp. i-iv, 1-61.

Reutemann, R., et al., "A 33mW 14b 2.5MSample/s ΣΔ A/D Converter in 0.25μm Digital CMOS," IEEE ISSCC 2002, Session 18, Converter Techniques, 18.6, 3 pages.

* cited by examiner

DIGITAL CONTROL OF POWER CONVERTERS

This application is a continuation of U.S. patent application Ser. No. 12/197,790, filed on Aug. 25, 2008, and entitled "Digital Control of Power Converters," which application claims the benefit of U.S. Provisional Application Ser. No. 61/038,348, filed on Mar. 20, 2008, and entitled "Digital Control of Power Converters," which applications are hereby incorporated herein by reference.

TECHNICAL FIELD

The present invention relates generally to a system and method for power conversion, and more particularly to a system and method for controlling the output voltage of DC/DC converters.

BACKGROUND

Generally, today's devices have systems with multiple power requirements, but which run off of a smaller number of, or even a single, power supplies, such as batteries. This is especially true of system-on-chip (SOC) devices, which contain multiple sections with different power requirements, but contain few connections to different power supplies. This is also true of portable devices that run off a single battery (such as a cellular phone). These devices and SOCs utilize power converters to take a single power source and convert the power to the levels necessary for each section.

FIG. 1 illustrates a typical power converter 101 along with its associated control circuitry 103. The power converter 101 typically comprises a Power P-FET 105 and a Power N-FET 107 in series between a power source 109 and a ground 111. A capacitor 117 runs in parallel with a power load 115, and an inductor 113 is connected between the capacitor 117/power load 115 and the connection between the P-FET 105 and the N-FET 107.

During operation of the power converter 101 the inductor 113 is connected to the power source 109 through the P-FET 105 and N-FET 107, resulting in storage of energy in the combination of inductor 113 and capacitor 117. The control circuitry 103 controls the "on" and "off" states of the P-FET 105 and the N-FET 107 such that the desired output voltage $V_{Out}$ is supplied to the power load 115.

The traditional control circuitry 103 consists of a continuous voltage, discrete time analog circuit comprising a first op amp 119, also called an error amp, a comparator 121, a ramp generator 123, and a pre-driver 125. The positive input to the first op amp 119 is connected to the power converter 101 between the inductor 113 and the capacitor 117/power load 115, while the negative input to the first op amp 119 is connected to a reference voltage $V_{Ref}$. The output of the first op amp 119 is connected to the negative input of the second op amp 121, while the output of the ramp generator 123 is connected to the positive input of the second op amp 121. The output signal from the second op amp 121 is routed to the pre-driver 125, which buffers the signals to the P-FET 105 and the N-FET 107, effectively controlling the power converter 101 in either "on" or "off" mode.

One disadvantage of the analog control circuit 103 is the difficulty in implementing a precise ramp generator 123, and the difficulty in controlling the loop response and dynamic performance of the control circuit 103 and power converter 101 using an analog system because the frequency response of the control loop can only be modified by changing the frequency response of the analog components, requiring a redesign and rebuild. Additionally, some mode of operation, such as pulse frequency modulation, require multiple error amps in order to implement, which increases the complexity of the design and control of the loop response.

Accordingly, what is needed is a control circuit that does not require a ramp generator and that allows easier control of the loop response of the control circuit and reduced complexity.

SUMMARY OF THE INVENTION

These and other problems are generally solved or circumvented, and technical advantages are generally achieved, by preferred embodiments of the present invention which provide for a control circuit for a power converter.

In accordance with a preferred embodiment of the present invention, a method for controlling a power converter comprises providing a power converter that has an output voltage. The output voltage is compared to a reference voltage and an analog error signal is generated. The analog error signal is converted to a digital error signal, and the digital error signal is compared to a threshold. If the digital error signal is less than the threshold, a pulse is generated and sent to the power converter to control the output voltage.

In accordance with another preferred embodiment of the present invention, a method for controlling a voltage comprises providing a voltage to be controlled and generating an analog output signal by comparing the voltage to be controlled to a reference voltage. The analog output signal is converted to a digital output signal and then compared to a first threshold value. If the digital output signal is less than the first threshold value, a control signal is generated, but if the digital output signal is greater than the first threshold value, no control signal is generated. The control signal is converted to a series of pulses with a substantially equal duration, wherein a frequency of the pulses controls the input voltage.

In accordance with yet another preferred embodiment of the present invention, a method for controlling a power converter comprises providing a power converter with a voltage to be controlled and comparing the voltage to be controlled with a reference voltage. The analog output signal is converted to a digital output signal and compared to at least one threshold value. If the digital output signal is less than the threshold value, a signal is generated, and a series of pulses that are substantially equal in duration is generated from the signal to control the power converter.

An advantage of a preferred embodiment of the present invention is a much greater ability to control the loop dynamics of the system, and a much more simple control of the system using fewer thresholds than previously required.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a control circuit for a DC-to-DC power converter. The invention may also be applied, however, to other control circuits.

Figure 1:
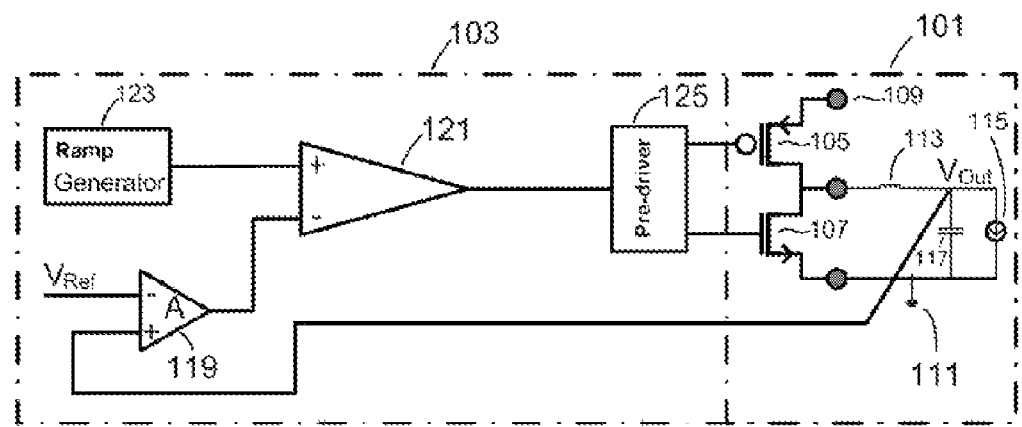
FIG. 1 illustrates a prior art circuit diagram of a power converter and its associated analog control circuit.
Figure 2:
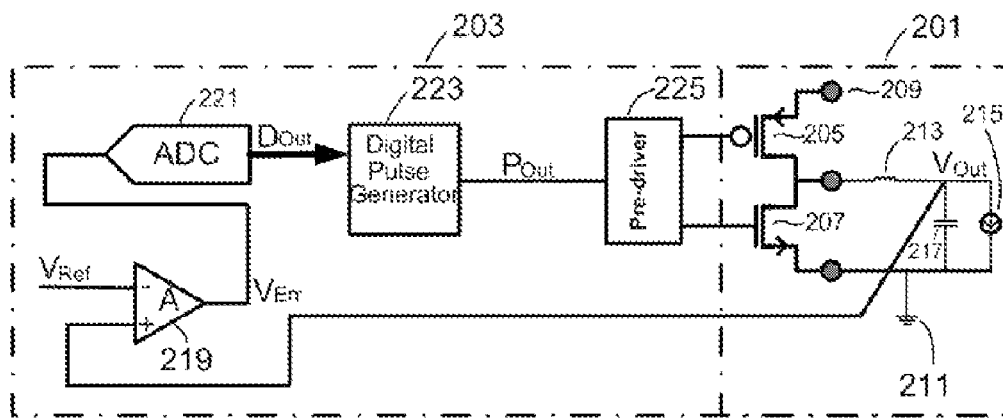
FIG. 2 illustrates a power converter and its associated partially digital control circuit in accordance with an embodiment of the present invention.

With reference now to FIG. 2, there is shown a power converter 201 and its associated control circuit 203. The power converter 201 is preferably a DC-to-DC "Buck" type power converter that supplies an output voltage $V_{Out}$ to a load 215, although other types of converters, such as "boost" converters or "Buck-boost" converters, may alternatively be used. The power converter 201 preferably comprises a Power P-FET 205 connected in series to a Power N-FET 207, with the gates of the P-FET 205 and the N-FET 207 controlled by the control circuit 203. The P-FET 205 is preferably connected to an input voltage source 209, while the N-FET 207 is preferably connected to a ground 211. The shared connection between the P-FET 205 and the N-FET 207 is preferably connected through an inductor 213 to the load 215, and a capacitor 217 is preferably connected in parallel with the load 215 to provide smoothing of the output voltage $V_{Out}$.

While the precise parameters of the power converter 201 are, of course, dependent upon the required load and design, one preferred embodiment of the power converter 201 preferably has an inductor 213 that has an inductance of between about 1 µH and about 10 µH, with a preferred inductance of about 2.2 µH. Further, the capacitor 217 preferably has a capacitance of between about 1 µF and about 20 µF, with a preferred capacitance of about 10 µF, and the load 215 preferably requires a current of between about 1 mA and about 1,000 mA, with a preferred current of about 600 mA.

It should be recognized that the preferred "Buck" type of power converter 201 is merely representative of one possible configuration for a power converter 201 that may be utilized with the present invention. Other configurations and designs for the power converter 201, such as "boost" converters and "Buck-boost" converters, may alternatively be used with the present invention, and these configurations and designs are fully intended to be included within the scope of the present invention.

The control circuit 203 (whose design is more fully described below) controls the P-FET 205 and the N-FET 207 to regulate the output voltage $V_{Out}$ coupled to the load 215. The control circuit 203 turns the P-FET 205 and the N-FET 207 "On" and "Off" in an alternating manner to charge and discharge the inductor 213, which supplies the current through the load 215. By controlling the timing and duration of the charging and discharging of the inductor 213, the output voltage $V_{Out}$ may be controlled.

Figure 3:
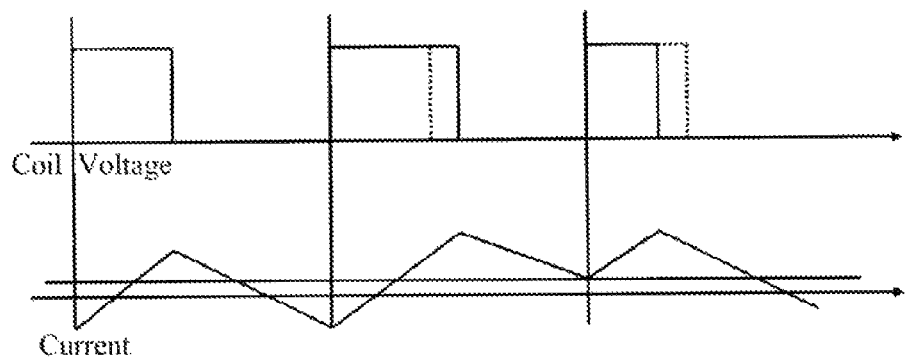
FIG. 3 illustrates a voltage and current diagram for pulse width modulated operation in accordance with an embodiment of the present invention.

The control circuit 203 preferably controls the P-FET 205 and the N-FET 207 in one of three manners. In Pulse Width Modulation mode (PWM mode) the control circuit 203 alternatively connects the inductor 213 to either the input voltage source 209 or the ground 211. FIG. 3 illustrates the voltage pulse and current used to charge the inductor 213. As illustrated, the width of the voltage pulse is variable (as illustrated by the dotted line) depending upon the instantaneous voltage output $V_{Out}$, and the current oscillates around a desired value, sometimes even going negative (e.g., the current is flowing into the power converter 201 instead of out of the power converter 201) at low currents. PWM mode may be desirable for use with high currents, such as currents greater than one-third of the maximum current of the power converter 201 (which is dependent upon the design of the power converter 201).

Figure 4:
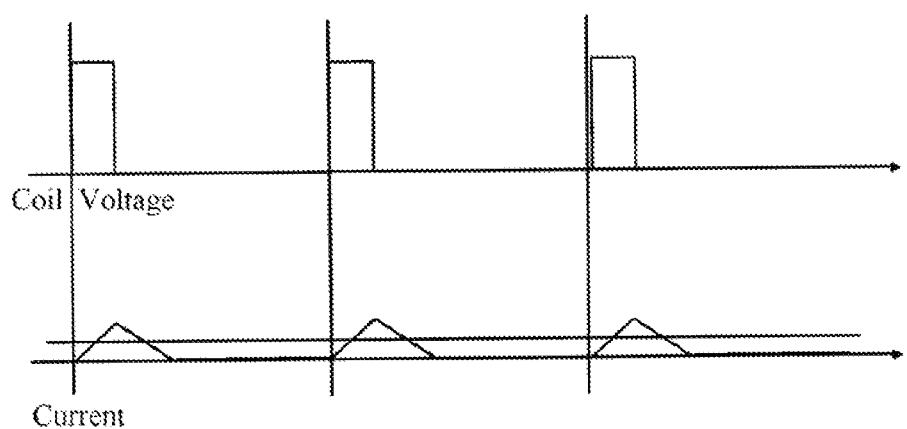
FIG. 4 illustrates a voltage and current diagram for auto mode operation in accordance with an embodiment of the present invention.

FIG. 4 illustrates a second preferred mode of operation, Auto mode. The Auto mode of operation is similar to the PWM mode except that, in addition to alternating between being connected to the input voltage source 209 and the ground 211, both the P-FET 205 and the N-FET 207 may be turned to an "Off" state during part of the time period. This effectively prevents the current from going negative, as is possible in PWM mode. As such, at high currents Auto mode acts similarly to PWM mode, but at low currents (e.g., currents less than ⅓ of the maximum current of the power converter 201), Auto mode creates a variable pulse and prevents the current from going negative.

Figure 5:
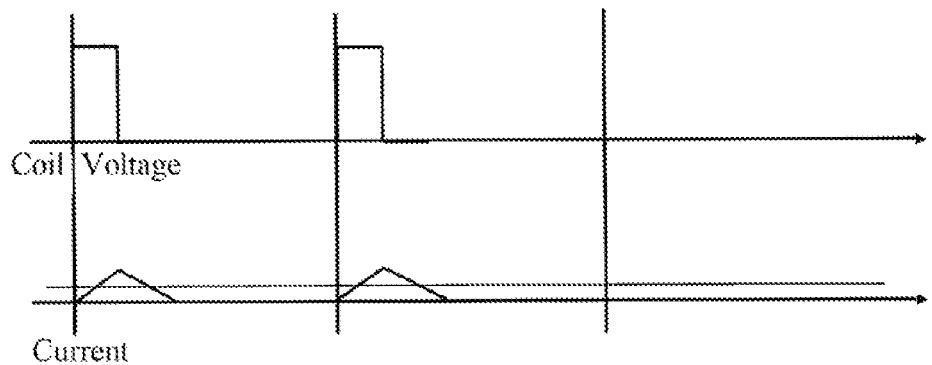
FIG. 5 illustrates a voltage and current diagram for pulse frequency modulation operation in accordance with an embodiment of the present invention.

FIG. 5 illustrates a third preferred mode of operation, Pulse Frequency Modulation (PFM) mode. In PFM mode a small voltage pulse is generated when the output voltage $V_{Out}$ drops below a lower threshold, and each of these pulses adds a small charge to the inductor 213, whose voltage output $V_{Out}$ decays in between the pulses. Each of the generated voltage pulses has the same time and shape, and the current is determined by the number of voltage pulses, not the duration of the pulses, as in PWM mode.

Because of this, PFM mode has historically been controlled using a hysteretic type of control implemented with two analog comparators to establish an upper and lower limit for the output voltage $V_{Out}$. For this control scheme, a pulse is generated when the output voltage $V_{Out}$ falls below the lower threshold, and pulses continue to be generated every cycle until the output voltage $V_{Out}$ exceeds the upper threshold. This results in a "pulse train" that causes more ripple on the output voltage $V_{Out}$. PFM mode is preferably used in low current operations, such as "sleep" or "standby" modes.

Returning to FIG. 2, the present invention implements these modes of operation using a preferred embodiment comprising a differential amplifier 219 to compare the output voltage $V_{Out}$ to a reference voltage $V_{Ref}$ and an analog-to-digital converter (ADC) 221 to convert the analog signal into a digital signal. A digital pulse generator 223 and a pre-driver 225 are preferably used to send pulses and to control P-FET 205 and N-FET 207. This preferred embodiment allows for a digital approach of controlling the power converter 201 instead of the traditional analog approach and its inherent drawbacks.

Preferably, the differential amplifier 219 comprises an error amplifier, although other configurations that produce an error signal may alternatively be used. The differential amplifier 219 amplifies the voltage difference between a non-inverting (+) input and an inverting (−) input. The reference voltage $V_{Ref}$ chosen by the design requirements is connected to the inverting (−) input and the voltage output $V_{Out}$ from the power converter 201 is connected to the non-inverting (+) input. In this configuration differential amplifier 219 compares $V_{Out}$ to $V_{Ref}$, and amplifies the difference to an output error signal $V_{err}$. A scaled version of $V_{Out}$ may also be used to compare against $V_{Ref}$. In that case, the output voltage will become a multiplied version of $V_{Ref}$. It should be noted that because the error signal $V_{err}$ is normally very small (especially when the control loop locks), the differential input range of the error amplifier can be very limited, typically to within a few tens of mV.

The analog output error signal $V_{err}$ from the differential amplifier 219 is connected to an input of the ADC 221. By converting only the error signal $V_{err}$ between $V_{Out}$ and $V_{Ref}$ instead of the entire $V_{Out}$ signal, the effective range of the control circuit 203 can be increased since the error signal $V_{err}$ will remain relatively small no matter what the actual $V_{Out}$ may be. This allows for a much larger range of control without the fear of overloading the control circuit 203, and also makes the task of designing the analog components of control circuit 203 much easier.

The ADC 221 converts the analog output error signal $V_{err}$ from differential amplifier 219 into an N-bit digital signal $D_{out}$. Analog output error signal $V_{err}$ is first sampled into a discrete-time signal and then the discrete-time signal is quantized into a finite number of quantization levels to produce $D_{out}$. For an N-bit digital signal $D_{out}$, the error signal $V_{err}$ is quantized into $2^N$ levels, with each level separated by a quantization step size.

The ADC 221 is preferably a Sigma-Delta ADC, although other types of ADCs, such as a flash ADC, a Pipeline ADC, Successive-Approximation ADC, Integrating ADC, or a Delta-Encoded ADC, could alternatively be used. ADC 221 preferably has a low-resolution and high-gain that produces an output with an accuracy of between 2 bits and 8 bits, with an even more preferred output of 5 bits. The ADC 221 is preferably over-sampled (as discussed below with reference to FIG. 7), but may alternatively operate as a Nyquist ADC where the sampling rate is equal to the clock/switching frequency of the P-FET 205 and the N-FET 207.

The digital signal $D_{out}$ of the ADC 221 is connected to the input of the digital pulse generator 223. Preferably, the digital pulse generator 223 employs a counter (not shown) which counts up to the value converted by the ADC 221. However, other types of digital pulse generators 223, such as digital one-shot or various digitally controlled timers, may alternatively be utilized. For a counting-type digital pulse generator 223, the counting frequency is preferably a multiple of the switching frequency of the P-FET 205 and the N-FET 207 so that the duty cycle will be proportional to the output of the ADC 221.

The output signal $P_{Out}$ of the digital pulse generator 223 is routed to the input of a Pre-Driver 225. The Pre-Driver 225 is preferably designed to amplify the output signal $P_{Out}$ from the digital pulse generator 223 and to control the P-FET 205 and the N-FET 207 in order to generate the pulses to the inductor 213. Additionally, the Pre-Driver 225 is preferably designed to control the P-FET 205 and N-FET 207 in such a way as to prevent shoot-through current from the input voltage source 209 to the ground 211. As such, any number of Pre-Drivers 225 may be used to control the P-FET 205 and the N-FET 207, and any of these Pre-Drivers 225 may be used with the present invention.

Figure 6:
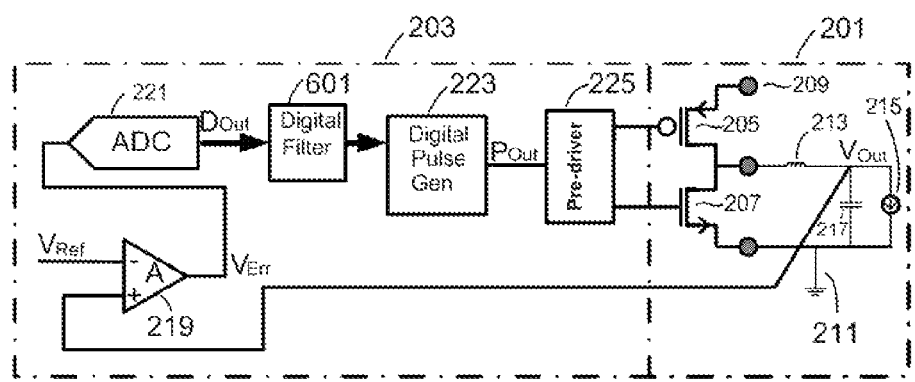
FIG. 6 illustrates a power converter and its associated partially digital, filtered control circuit in accordance with an embodiment of the present invention.

FIG. 6 illustrates a second preferred embodiment in which a programmable first digital filter 601 is connected between the ADC 221 and the digital pulse generator 223 of FIG. 2. The first digital filter 601 is preferably programmable to supplement and better control the analog frequency response and transfer function so that the loop response of the system can be precisely controlled. In other words, the frequency response of the first digital filter 601 can be matched to the remaining analog components of the control circuit 203 to achieve any desired loop response, thereby eliminating the problems associated with analog loop control.

Additionally, the first digital filter 601 could also be programmed for additional functions besides frequency response control. Functions such as integration, differentiation, supplying additional DC gain, combinations of these functions, or the like could be made by programming such functions into the first digital filter 601. Further, reprogramming the first digital filter 601 may be performed adaptively and on-line while the power converter 201 and the control circuit 203 are operating, without requiring a complete shutdown of the system for each reprogramming.

The advantages of such a programmable, first digital filter 601 are immense. By using a programmable first digital filter 601 to complement and control the frequency response of the analog components, the design of the system becomes much more flexible than if each component had to be designed and built for an analog loop response. Further, adjustments could be made post-production, if necessary, by reprogramming the first digital filter 601, instead of having to completely redesign and reproduce the entire power converter 201 and control circuit 203.

Figure 7:
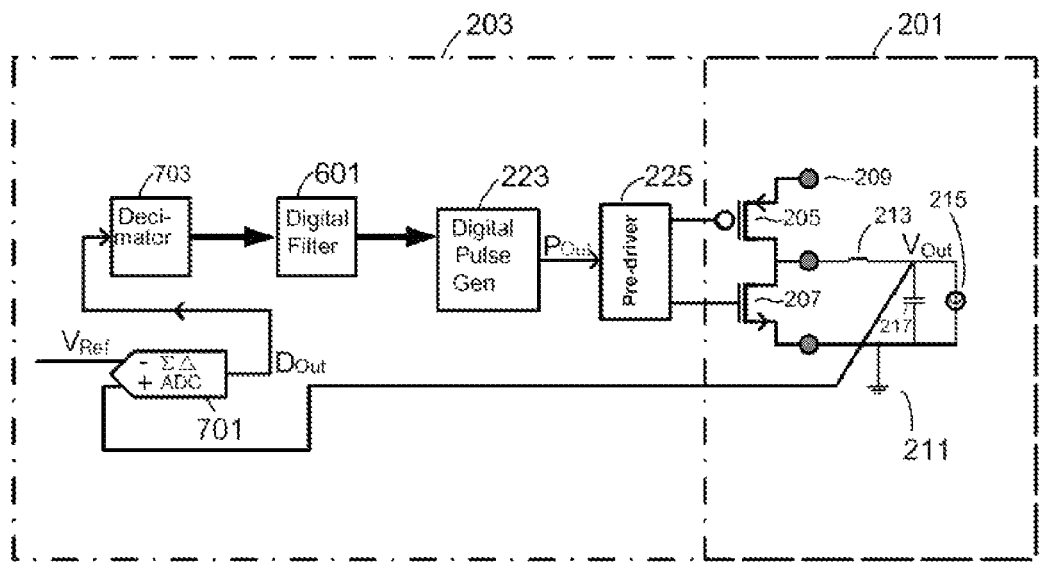
FIG. 7 illustrates a power converter and its associated oversampled, partially digital control circuit in accordance with an embodiment of the present invention.

FIG. 7 illustrates another preferred embodiment of the present invention in which the differential amplifier 219 is combined into an over-sampled ADC 701 and a decimator 703. By using the over-sampled ADC 701, the system may be better able to average the output voltage $V_{Out}$ due to a better capture of transients. Further, a higher clock rate may be implemented in the oversampled ADC 701, which may be more compatible with advanced process technology.

In a preferred embodiment, the over-sampled ADC 701 is implemented by combining the differential amplifier 219 with a Sigma-Delta modulator/ADC 701 in series with a decimator 703. The Sigma-Delta ADC 701 preferably over-samples the output signal $V_{Out}$ by sampling at a rate that is much higher than the Nyquist frequency to produce the digital output $D_{Out}$, thereby concentrating quantization noise in the higher frequencies. The Sigma-Delta ADC 701 preferably has an oversampling frequency that is a multiple of the Nyquist frequency, and preferably has an oversampling ratio of between about 2 and about 256, with a preferred oversampling ratio of about 32.

The digital output signal $D_{out}$ from the Sigma-Delta ADC 701 is connected to the input of the decimator 703. The decimator 703 preferably performs two separate functions. First, the decimator 703 is preferably designed to resample the digital output signal $D_{Out}$ from the Sigma-Delta ADC 701 and provide a multi-bit data word at the Nyquist rate. Additionally, the decimator 703 is also designed as a low-pass filter to remove the quantization noise that has been concentrated in the higher frequencies, thereby increasing the resolution of the Sigma-Delta ADC 701. A simple way of implementing the decimator for a 1-bit sigma-delta converter is to implement a circuit counting the number of logic ones coming out of the converter during one period of the lower frequency clock (Nyquist rate).

Figure 8:
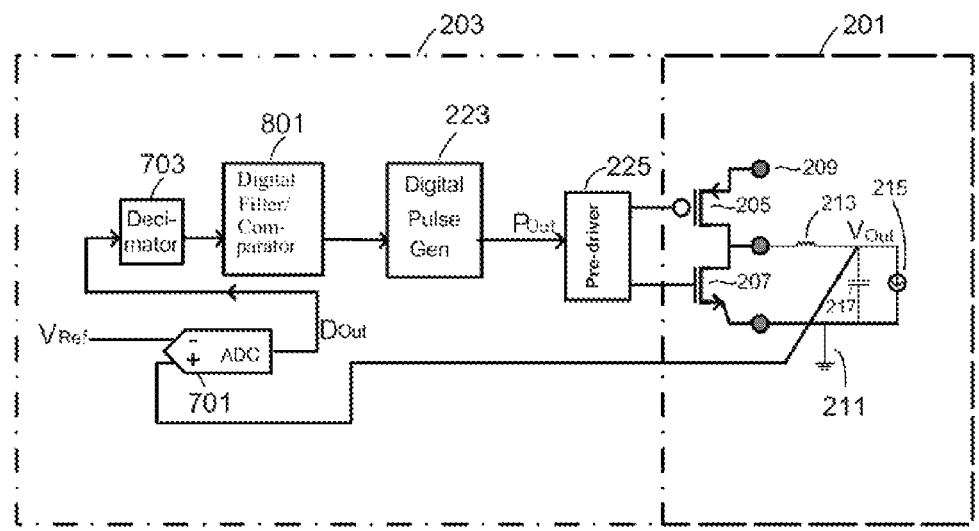
FIG. 8 illustrates a power converter and its associated digitally filtered control circuit in accordance with an embodiment of the present invention.

FIG. 8 illustrates an embodiment of the present invention that is particularly useful when implemented with a PFM mode of operation. In this embodiment the output voltage $V_{Out}$ is preferably connected to an input of an oversampled Sigma-Delta ADC 701 and decimator 703. The oversampled Sigma-Delta ADC 701 and decimator 703 are preferably similar to the Sigma-Delta ADC 701 and decimator 703 described above with reference to FIG. 7. However, as one of ordinary skill in the art will recognize, any combination of differential circuit and analog-to-digital converter that supplies the digital signal $D_{out}$ from the output voltage $V_{Out}$ and the reference voltage $V_{Ref}$, such as a Nyquist ADC (which would not require the decimator 703), may alternatively be used, and the invention is not intended to be limited to the use of a Sigma-Delta ADC 701 and a decimator 703.

The digital signal $D_{Out}$ from the Sigma-Delta ADC 701 is preferably routed through the decimator 703 and then to PFM digital filter 801. The PFM digital filter 801 is preferably implemented as a digital comparator in order to compare the digital signal $D_{out}$ from the Sigma-Delta ADC 701 to one, two or more thresholds in order to control the power converter 201 as described below. The PFM digital filter 801, however, is not intended to be limited to a comparator, and may perform other functions similar to the first digital filter 601 described above with reference to FIG. 6, such as controlling the loop response of the overall control system 203.

The PFM digital filter 801 preferably has at least one threshold that is compared against the digital signal $D_{out}$. If only one threshold is compared against the digital signal $D_{out}$, then a signal is preferably sent to the digital pulse generator 223 (and a pulse is generated) when the digital signal $D_{out}$ is below the single threshold, but a signal is not sent to the digital pulse generator 223 if the digital signal $D_{out}$ is above the threshold. A typical threshold value would range between about 0.1% and about 2% of the output voltage $V_{Out}$, with a preferred threshold of about 0.5% of the output voltage $V_{Out}$.

In an alternative embodiment, the PFM digital filter 801 preferably has two separate thresholds: an upper threshold and a lower threshold. In this embodiment the digital signal $D_{out}$ from the Sigma-Delta ADC 701 is compared against the lower threshold. If the digital signal $D_{out}$ is lower than the lower threshold, then the PFM digital filter 801 sends a signal to trigger the digital pulse generator 223 to generate a pulse. In this embodiment, different from the single-threshold embodiment described above, the PFM digital filter 801 continues to send signals to the digital pulse generator 223 until the digital signal $D_{out}$ climbs above the upper threshold, at which point and time the PFM digital filter 801 ceases to send signals to the digital pulse generator 223.

Optionally, a mode shift threshold may also be utilized along with either the single or double thresholds described above to shift the operation of the control circuit from PFM mode to an alternative mode of operation. This mode shift threshold is preferably used in high current situations when the digital signal $D_{out}$ is either too high or too low, and PFM mode is not the preferred mode of operation. When the digital signal $D_{out}$ crosses the mode shift threshold, the overall control circuit 203 preferably shifts from PFM mode to another mode, such as PWM mode, to better operate the power converter 201. Mode shift thresholds preferably range from about 0.5% to about 5% of the reference voltage $V_{Ref}$, with a preferred emergency threshold of about 1% of the reference voltage.

Because these thresholds are implemented in the PFM digital filter 801, the thresholds may be varied digitally. This also allows the thresholds to be changed on the fly, during operation of the overall control circuit 203, which can be tremendously advantageous as it does not require a complete re-design of the circuit.

In this fashion the overall control circuit 203 and power converter 201 may be operated as Sigma-Delta control loop. When configured like this, the PFM digital filter 801 (such as a comparator) may be seen as a coarse ADC, the digital pulse generator 223 may be seen as a coarse digital-to-analog converter (DAC), and the power converter 201 implicitly acts as a primary integrator. The primary difference between this embodiment and a traditional Sigma-Delta is that the coarse digital-to-analog signal is integrated (through the power converter 201), and the difference with the reference voltage $V_{Ref}$ is then calculated, instead of integrating the error between the output voltage $V_{Out}$ and the reference voltage $V_{Ref}$.

The signal to the digital pulse generator 223 is preferably a one-bit signal that triggers the digital pulse generator 223 to generate a pulse. The current invention, however, is not intended to be limited to a one-bit signal between the PFM digital filter 801 and the digital pulse generator 223. Any suitable signal, such as a multi-bit signal or even multiple signals, may alternatively be utilized to trigger the digital pulse generator 223.

Optionally, random noise may also be injected into the loop in a process commonly known as dithering. In a first-order system such as this embodiment, tones are possible when certain ADC and DAC patterns keep repeating, which may become an issue if these tones coincide with the natural frequency of the power converter 201. Dithering may help to resolve this problem and lessen or reduce the impact of these tones on the performance of the control circuit 203.

Figure 9:
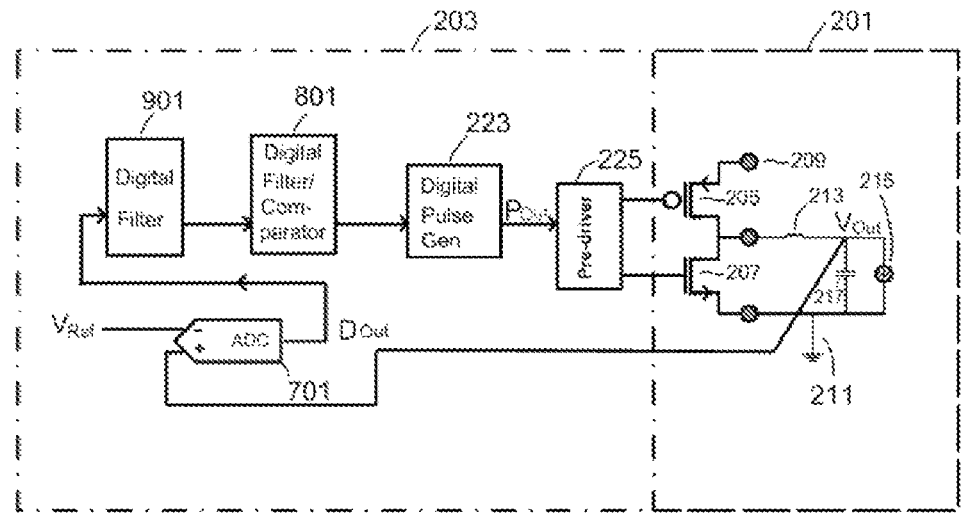
FIG. 9 illustrates a power converter and its associated control circuit with multiple digital filters in accordance with an embodiment of the present invention.

FIG. 9 illustrates another embodiment that is particularly advantageous to PFM mode of operation, which is similar to the embodiment in FIG. 8, but preferably also comprises a control filter 901 in line between the Sigma-Delta ADC 701 and the PFM digital filter 801. The control filter 901 is preferably similar to the first digital filter 601 described above with reference to FIG. 6. For example, the control filter 901 may be programmed to control the loop response of the analog components of the overall control circuit 203 and the power converter 201.

Optionally, in this embodiment, the control filter 901 may also be programmed as a secondary integrator (a first integrator is already implicitly formed by the power converter 201). Using the control filter 901 as a secondary integrator would add additional functionality to avoid stability problems that can become an issue in higher order systems.

Figure 10:
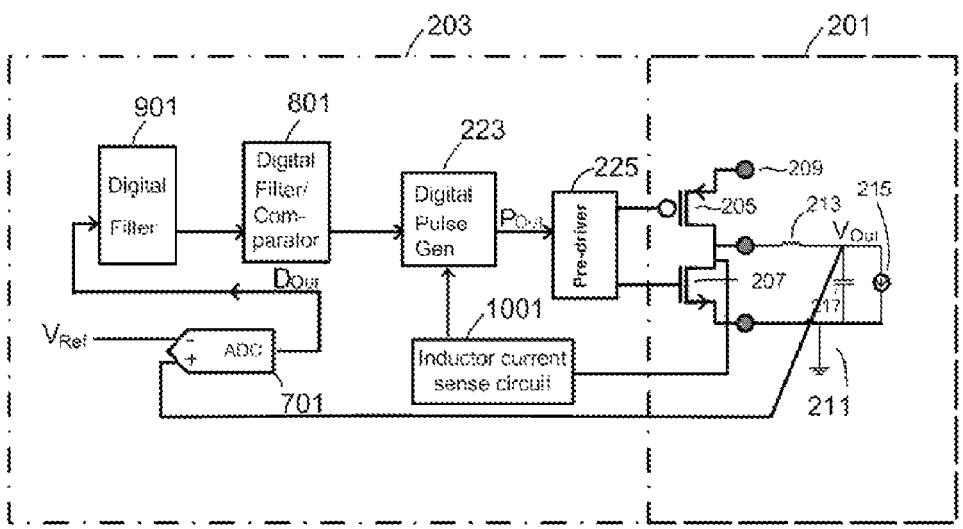
FIG. 10 illustrates a power converter and it associated control circuit with an inductor current sense circuit in accordance with an embodiment of the present invention.

FIG. 10 illustrates yet another embodiment that includes an inductor current sense circuit 1001 connected between the drain of the Power N-FET 207 and the digital pulse generator 223. In an embodiment in which the digital pulse generator 223 employs a counter, the counter is preferably used to turn "on" the Power P-FET 205 for a specific duration of time determined by the digital pulse generator 223 (as described above with respect to FIG. 2). After that time has elapsed, the Power P-FET 205 is turned "off" and the Power N-FET 207 is turned "on." The inductor current sense circuit 1001 is configured to disable the Power N-FET 207 at the time when the inductor current reaches zero, thereby completing one PFM pulse.

These preferred embodiments of the present invention provide great flexibility and adaptability to the design and operation of power converter control circuits. By implementing a digital comparator after the ADC in PFM mode, a single threshold may be used to control the power converter. Additionally, this threshold may be changed on the fly and during operation of the circuit, thereby avoiding costly re-designs.

Although the present invention and its advantages have been described in detail, it should be understood that various changes, substitutions and alterations can be made herein without departing from the spirit and scope of the invention as defined by the appended claims. For example, it will be readily understood by those skilled in the art that the type of power converter (e.g., a boost type of converter instead of the "Buck" type of converter) or the exact components of the power converter (e.g., replacing the Power P-FET with a n-channel lateral depletion NMOS as the high-side driver) may be varied while still remaining within the scope of the present invention. Additionally, other components such as an attenuator may be added to the control circuit as needed by the design while still remaining within the scope of the present invention.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for controlling a power converter, the system comprising:
   a differential unit with an input connected to an output voltage of the power converter;
   an analog-to-digital converter communicably coupled to an output of the differential unit, the analog-to-digital converter being separate from the differential unit;
   a digital filter communicably coupled to an output of the analog-to-digital converter; and
   a digital pulse generator communicably coupled to an output of the digital filter;
   wherein the power converter receives a direct current input.

2. The system of claim 1, wherein the digital filter is configured to have an output of between about 1 to about 8 bits.

3. The system of claim 1, wherein the digital filter is configured to control a loop response of the system.

4. The system of claim 1, wherein the analog-to-digital converter comprises a sigma-delta modulator.

5. The system of claim 4, further comprising a decimator and a second digital filter communicably coupled between the sigma-delta modulator and the digital pulse generator.

6. The system of claim 1, wherein the differential unit is configured to generate an error signal.

7. The system of claim 6, wherein the analog-to-digital converter is configured to oversample the error signal.

8. The system of claim 1, further comprising a pre-driver communicably coupled to an output of the digital pulse generator.

9. The system of claim 8, further comprising a power converter communicably coupled to the input of the differential unit, and communicably coupled to an output of the pre-driver.

10. A system for power conversion control, the system comprising:
    a differential amplifier comprising a first input connected to a reference voltage, a second input connected to a voltage for a load to be controlled, the voltage received by the differential amplifier being the same as the voltage being received by the load;
    an analog-to-digital converter communicably coupled to the error output of the differential circuit; and
    a digital pulse generator communicably coupled to an output of the analog-to-digital converter.

11. The system of claim 10, further comprising a digital filter communicably coupled between the analog-to-digital converter and the digital pulse generator.

12. The system of claim 11, wherein the digital filter is configured to control a loop response of the system.

13. The system of claim 10, wherein the analog-to-digital converter is configured to oversample an analog error signal from the differential circuit.

14. The system of claim 10, further comprising a pre-driver communicably coupled to an output of the digital pulse generator.

15. A power conversion system comprising:
    a power converter configured to operate at a first clock frequency, the power converter being a direct current-to-direct current power converter;
    an analog-to-digital converter communicably coupled to an output voltage of the power converter, the analog-to-digital converter configured to sample the output voltage at a second clock frequency higher than the first clock frequency;
    a first digital filter communicably coupled to the analog-to-digital converter, the first digital filter configured to output a signal at the first clock frequency;
    a digital pulse generator communicably coupled to the first digital filter and the power converter; and
    a differential circuit communicably coupled between the output voltage of the power converter and the analog-to-digital converter, the differential circuit being separate from the analog-to-digital converter, the output voltage being connected to a load.

16. The power conversion system of claim 15, wherein the analog-to-digital converter comprises a sigma-delta modulator.

17. The power conversion system of claim 16, wherein the differential circuit is configured to output an error signal to the analog-to-digital converter.

18. The power conversion system of claim 15, wherein the second clock frequency is a multiple of the first clock frequency.

19. The power conversion system of claim 15, wherein the digital pulse generator comprises a counter.

20. The power conversion system of claim 15, further comprising a second digital filter communicably coupled between the first digital filter and the digital pulse generator.

* * * * *